United States Patent

[11] 3,575,467

| [72] | Inventor | Charles S. Davis<br>Benton, Ill. |
|---|---|---|
| [21] | Appl. No. | 806,171 |
| [22] | Filed | Mar. 11, 1969 |
| [45] | Patented | Apr. 20, 1971 |
| [73] | Assignee | Carmet Company<br>Pittsburgh, Pa. |

[54] CUTTER BIT AND BLOCK
5 Claims, 2 Drawing Figs.
[52] U.S. Cl. .................................................. 299/92
[51] Int. Cl. ...................................................... E21c 35/18
[50] Field of Search .......................................... 299/91–93; 137/142, 142 (R)

[56] References Cited
UNITED STATES PATENTS
| 1,777,222 | 9/1930 | Pierce | 37/142 |
| 2,810,567 | 10/1957 | Kirkham | 299/93 |
| 3,093,366 | 6/1963 | Proctor | 299/92 |
| 3,453,756 | 7/1969 | Schroeder | 299/91 |

*Primary Examiner*—Ernest R. Purser
*Attorneys*—Richard A. Speer, Vincent G. Gioia and Howard R. Berkenstock, Jr.

ABSTRACT: Cutting apparatus for use in underground mining industry including a cutting tool holder and a cutting tool containing a carbide cutting insert where the cutting tool includes a head portion and a shank portion disposed substantially perpendicularly to the head portion, the cutting tool shank being received in a bore in the cutting tool holder disposed at an acute angle to the cutting insert and in which cutting apparatus the forces resulting from the cutting action are communicated substantially axially to the cutting tool holder.

PATENTED APR 20 1971
3,575,467
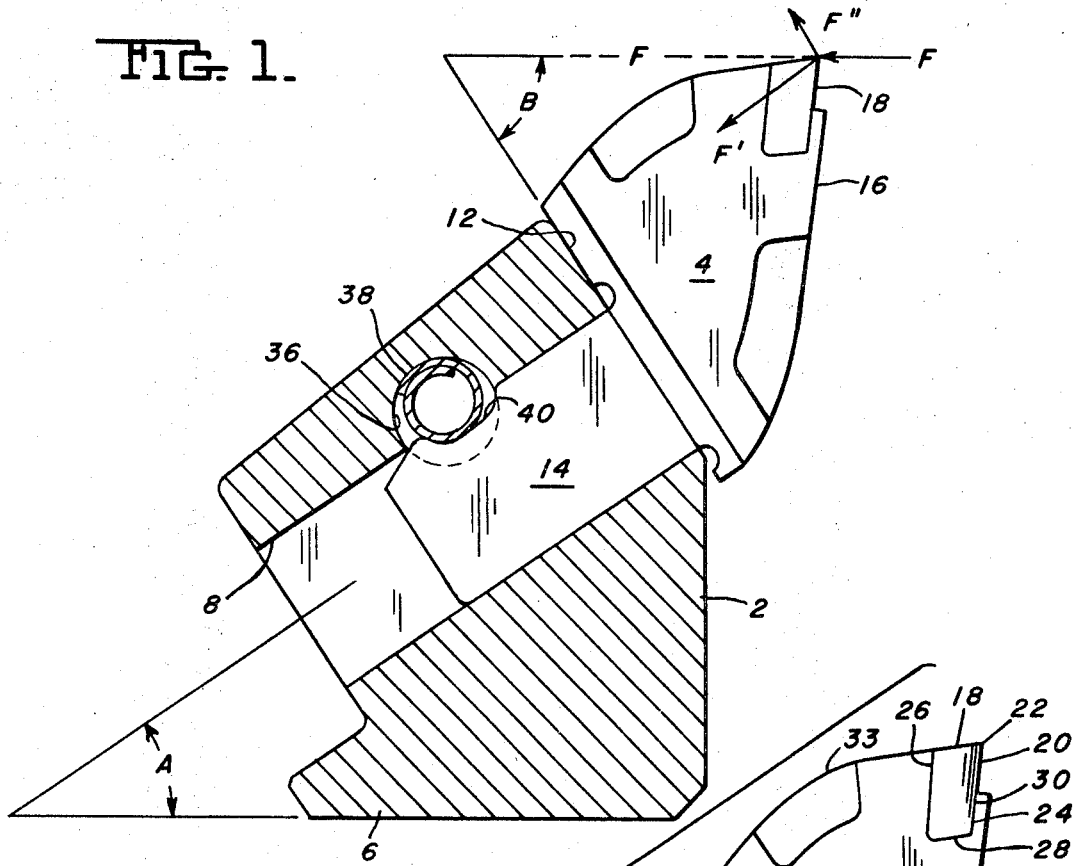
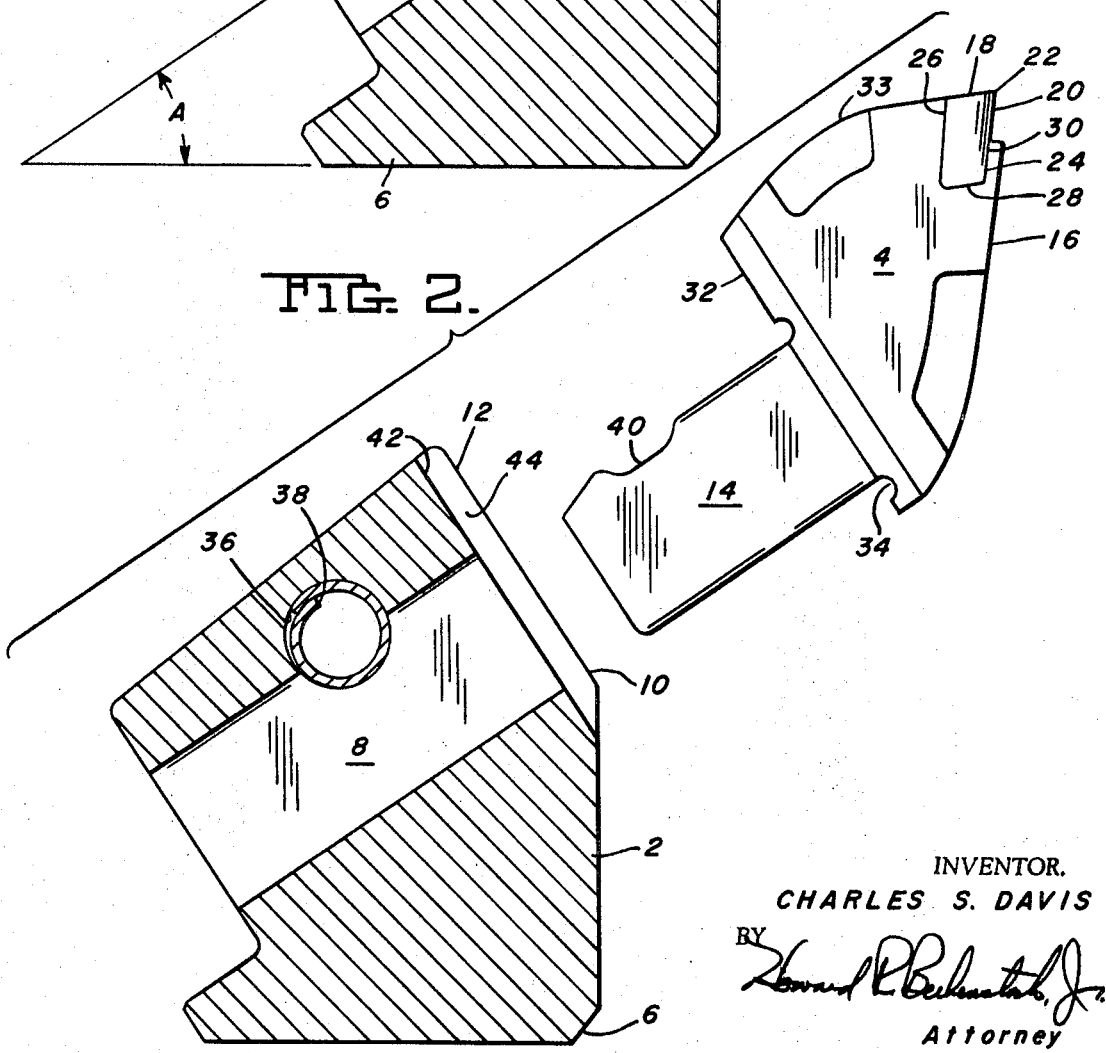
INVENTOR.
CHARLES S. DAVIS
BY
Attorney

CUTTER BIT AND BLOCK

BACKGROUND OF THE INVENTION

This invention relates to cutter bits and holders therefor such as are used in underground mining industry. In mining machinery the cutter bit holders are mounted on powered heads or chains. Various structural arrangements have been employed to mount the cutter bit holders and cutter bits most advantageously for mining operations. It will be understood that the bits of mining machinery, as well as the heads or chain elements supporting the holders, are subjected to great stresses during cutting operations and also to excessive vibration. In conventional configurations the cutting tool includes a head mounting a cutting insert and a shank connected to the head such that the axis of the shank is substantially perpendicular to the cutting action. Thus, during the excessive vibration and great stresses of the cutting action a bending moment is developed within the bit holder according to the forces operating on the cutting tool shank. Prolonged use of these devices under the aggravated conditions results in a high failure rate due to splitting of the bit holder or breaking of the shank mounting the cutting head. The attendant high failure rate of these devices thus causes costly down times for the equipment, decreasing production as well as consuming expensive cutting tools.

SUMMARY OF THE INVENTION

A cutting tool holder and a cutting tool for principle use in underground mining which transmits the forces generated in cutting more directly and more uniformly to the cutting tool holder than conventional cutting tools and cutting tool holders. The cutting tool consists of an enlarged head portion, the backside of which forms a shoulder and from which a shank protrudes. The shank is adapted to be received in a bore in the cutting tool holder which opens into a face on the cutting tool holder, and the face is adapted to be in abutting relationship with the shoulder when the cutting tool is inserted into the cutting tool holder. The axis of the bore and shank are oriented at an acute angle with the direction of the cutting forces such that cutting forces will be communicated to the holder from the cutting tool by means of the abutting relationship of the face and shoulder.

It is therefore an object of my invention to provide a cutting tool and a cutting tool holder which cooperate to transmit cutting forces through the cutting tool to the cutting tool holder compressively rather than through bending moments.

A further object of my invention is to provide a cutting tool and cutting tool holder which more uniformly support a cutting insert contained within the cutting tool.

These and other objects will be more evident from the description of the preferred embodiment which follows.

DESCRIPTION OF THE DRAWINGS

FIG. 1 is a longitudinal sectional view of a cutting tool holder showing cutting tool in position therein, and vectoral representation of the forces acting thereon;

FIG. 2 is an exploded view showing a longitudinal section of the cutting tool holder together with the cutting tool.

DESCRIPTION OF THE PREFERRED EMBODIMENT

Referring now to the drawings reference numeral 2 indicates a block for mounting a cutting tool 4. The holder 2 has a base 6 for attachment to conventional mining machinery (not shown) and an axial bore 8 which may be rectangular, as shown in the example, running therethrough. The centerline of the bore 8 lies in a plane forming an angle A with the base 6 of holder 2. Further, the holder 2 has a side 10 containing a face 12 into which bore 8 opens. The cutting bit 4 has a shank 14 adapted to be closely received within bore 8 and a head 16 connected to the shank 14 supporting a cutting insert 18 having a face 20 and a cutting edge 22 within a socket 24 having a backwall 26 and a bottom 28 and a retaining edge 30.

On the side of cutting bit 4 from which shank 14 protrudes is a shoulder 32 being part of cutting head 16 and adapted to bear on face 12 of block 2. Within the shoulder 32 are concave rounds 34 at the intersection of the shoulder 32 with shank 14. Holder 2 is adapted to contain retaining means to hold the bit 4 within the holder 2 such as bore 36 containing holding means such as a spring keeper 38 which engages a detent 40 in shank 14.

FIG. 2 illustrates a similar cutting tool 4 contained within a holder 2 adapted with a slot 42 having sides 44 to receive shoulder 32.

In operation cutting tool 14 is mounted in block 2 by shank 14 being received within bore 8 sufficiently far that shoulder 32 bears on face 12. When the cutting tool is so engaged in holder 2, the holding means 38 engages detent 40 securing the cutting tool 4 within the holder 2. As the cutting tool is advanced by the mining equipment (not shown) to engage the material to be cut, a cutting force designated $F$ is developed as shown in FIG. 1. Cutting tool 4 is so structured that shoulder 32 lies in a plane which forms an acute angle $B$ with the cutting force $F$. The axis of shank 14 is constructed substantially perpendicular to shoulder 32. The cutting force $F$ may be represented by two vectors shown in FIG. 1, $F'$ perpendicular to shoulder 32 face 12 and $F''$ parallel to surfaces 32 and 12. By maintaining the angle $B$ between the cutting force $F$ and the plane 32; 12 larger than 45° a greater amount of the cutting force is directed perpendicularly to the plane and axially with shank 14 and bore 8. Likewise by maintaining the angle $B$ large the vector parallel to plane 32, 12, and thus perpendicular to shank 14 and bore 8, is minimized. The effect of maximizing force $F'$ and minimizing force $F''$ is to cause the material behind the bit 18 in head 16 to be compression, providing a more uniform support for the cutting insert 18. Further minimizing force $F''$ minimizes any bending moment that might exist within shank 14 and bore 8. If, while under load, the force $F''$ is maintained below the maximum sliding friction force that can be developed between shoulder 32 and face 12 the bending moment within shank 14 and bore 8 is maintained at zero. Because of the more uniform support to cutting insert 18 a more wear resistant, and a harder cutting material, may be used, by example, tungsten carbide. The overall effect then is to create a holder and a cutting tool which is capable of using a higher grade of tungsten carbide which is more wear resistant and thus requires less frequent replacement while also reducing the internal minimizing the failure rate within the holders 2 and cutting tool 4.

To clear the area immediately behind the cutting tool 4 a rake of approximately 10° is maintained on the cutting bit 18 and along the top edge 16 rounds at 33 adjacent shank 14 and shoulder 32 to prevent dragging of the tool behind the cut. The amount of the rake may be varied, and is in part dependent upon the speed of advance of the cutting machine. The cutting insert in the example leads (or is positive) the block at about 5° This cutting angle is conventionally −10° to +10° depending upon the material to be cut and the cutting insert.

Though the example discloses a spring keeper 38 contained within bore 36 cooperating with detent 40 to retain the cutting tool 4 within holder 2, the invention herein disclosed is not to be considered so limited. It is recognized that many conventional resilient materials might be inserted within the bore 36 to cooperate with the bore and detent 40 to secure cutting tool 4 within holder 2.

By slotting the face 12 as shown in FIG. 2 at 42, the shoulder 32 may be keyed into the holder 2. Often in operation, a cutting tool will be subjected to lateral forces and the groove walls 44 provide additional surfaces for these cutting forces to be transmitted to the holder 2 from the cutting tool 4. The additional surfaces 44 then support the forces which would otherwise have to be taken up by the shank 14 in bore 8. The tool 4 and holder 2 are thus relieved of additional stresses concentrated in the bore and shank area further prolonging the service life of the tool and holder.

While one embodiment of my invention has been shown and described in detail, it will be apparent that other adaptations and modifications may be made without departing from the scope thereof.

I claim:

1. Cutting apparatus for use in mining operations comprising a cutting tool holder having a base portion and a bore running through said holder, the axis of said bore forming an acute angle with the plane of said base, said holder having a support face disposed substantially perpendicular to said bore and into which face said bore opens; a cutting tool having a head portion adapted to contain cutting means, a shank portion adjoining said head and adapted to be received in said bore, said head having a shoulder extending outwardly on at least two opposite sides of said shank adapted to bear on said face, cutting means disposed in said tool having a cutting edge lying in a plane forming an acute angle with the juncture of said face and said shoulder, said shoulder and said face further disposed at an angle of between 40° and 70° to the action of the forces of cutting generated at said cutting edge, said face and shoulder thereby cooperating to transmit substantially all of the forces generated in the cutting tool to said holder so as to relieve the shank of bending stresses within said bore.

2. Apparatus according to claim 1 wherein the cutting tool included a cutting insert, the cutting edge of which lies on a plane forming an angle of between 0° and 10° with the perpendicular to the direction of advance of said tool.

3. Apparatus according to claim 2 wherein said bore is rectangular in cross section and said shank is adapted to be closely received in said bore.

4. Apparatus according to claim 3 wherein said face is slotted to closely receive said shoulder whereby said cutting tool is keyed to said holder.

5. Apparatus according to claim 4 including means to retain said tool in said holder.